United States Patent [19]

Hurt

[11] Patent Number: 4,726,138
[45] Date of Patent: Feb. 23, 1988

[54] METHOD OF MAKING A FISHING LURE

[76] Inventor: Brian D. Hurt, 712 Red River, Austin, Tex. 78701

[21] Appl. No.: 53,678

[22] Filed: May 26, 1987

[51] Int. Cl.⁴ .............................................. A01K 85/00
[52] U.S. Cl. ......................................... 43/4.5; 43/41; 43/42.24
[58] Field of Search ...................... 43/4.5, 4, 44.8, 41, 43/44.29, 44.24

[56] References Cited

U.S. PATENT DOCUMENTS

| | | | |
|---|---|---|---|
| 2,102,739 | 12/1937 | Peters | 43/41 |
| 2,869,279 | 1/1959 | Pretorius | 43/42.24 |
| 3,047,975 | 8/1962 | Pretorius | 43/42.24 |
| 3,487,575 | 1/1970 | Jones | 43/4 |
| 3,526,988 | 9/1970 | Young | 43/4 |
| 3,802,115 | 4/1974 | Auten et al. | 43/42.31 |
| 3,835,572 | 9/1974 | Mounsey | 43/42.06 |
| 3,918,190 | 11/1975 | Hornbeck | 43/4.5 |
| 3,991,504 | 11/1976 | Pieper | 43/42.06 |
| 4,589,223 | 5/1986 | Hastings | 43/42.24 |

Primary Examiner—Gene P. Crosby
Attorney, Agent, or Firm—Walter C. Farley

[57] ABSTRACT

An elongated, hollow artificial lure is filled with live worms by placing the worms in the chamber of a syringe, applying pressure to the chamber and injecting the worms through a small diameter nozzle into the interior of the lure. The resulting lure has not only the scent of the natural bait but also motion imparted by the motion of the live worms injected therein.

1 Claim, 1 Drawing Figure

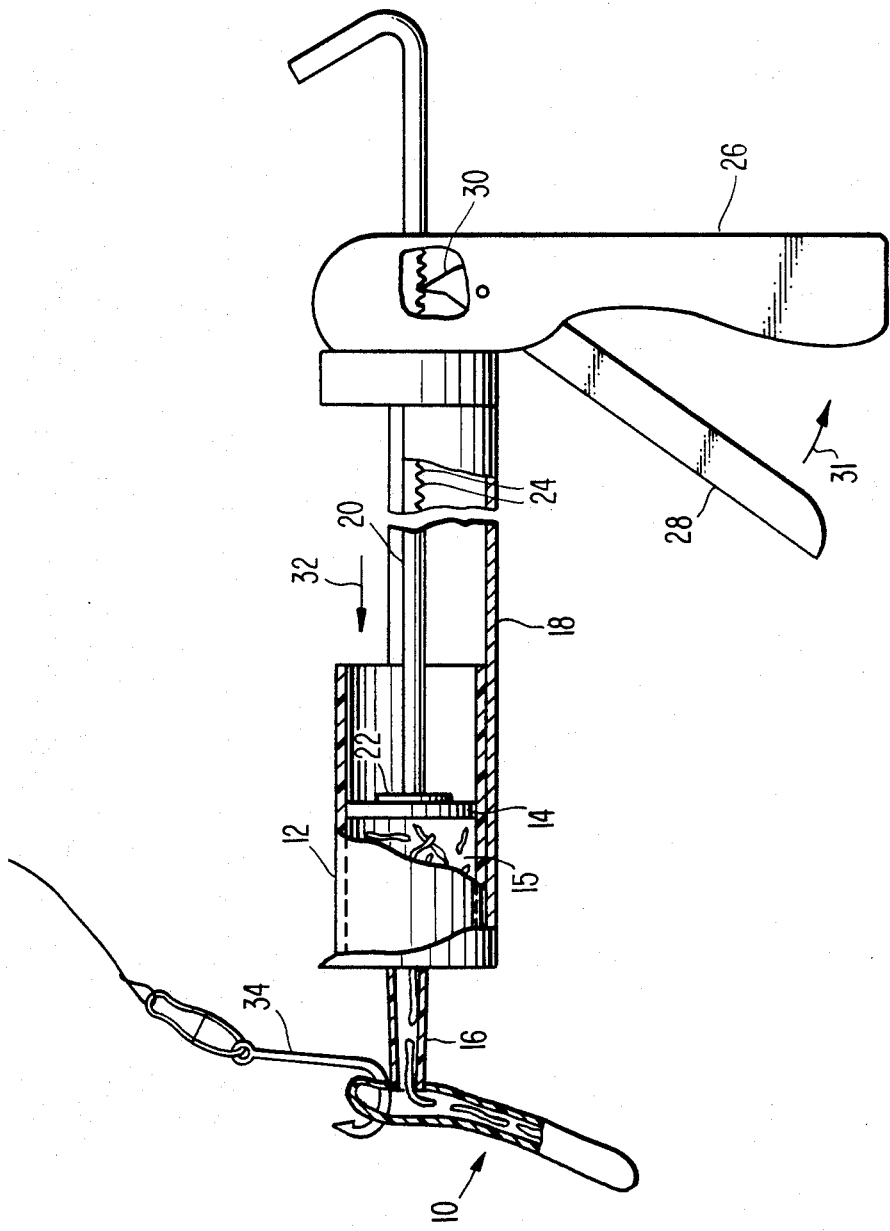

METHOD OF MAKING A FISHING LURE

This invention relates to a method of making a lure and which has very life-like qualities of motion and scent and is therefore attractive to fish but which, in part, is an artificial lure and thus is durable and usable for a long time.

BACKGROUND OF THE INVENTION

There are probably hundreds, and possibly thousands, of different kinds of lures which have been produced in the perennial effort to attract fish to a fish hook. Some such lures are used because they are more attractive to certain kinds of fish under certain conditions, but they are also more durable in the sense that fish cannot "steal" the bait as often happens when live bait, such as worms or the like, are placed directly on a fish hook.

Nevertheless, for some kinds of fish and under some circumstances, there is no real substitute for the motion and scent of a live earthworm or angle worm, or other live bait, for attracting fish.

This general concept has been recognized and utilized in some lures which combine "fish food" in some form with an artificial lure. That step was probably a significant improvement because game fish have a highly developed sense of smell (or taste) and are attracted to a source of natural food. But such lures are still artificial in appearance. There is a wide variety of shapes and sizes of lures with noise makers, various colors and reflective parts or surfaces, all of which are intended to attract by simulating life-like action of the fish's natural food but, as indicated above, even these lures have limited usefulness because they do not simulate the life-like motion of the natural food or bait itself.

SUMMARY OF THE INVENTION

Accordingly, an object of the present invention is to provide a method of making a lure which actually contains moving, live bait which imparts to the lure the appearance, as well as the scent, of the natural bait but which retains the durability of the artificial lure.

Briefly described, the invention comprises a method of making a lure which is attractive to fish including the steps of forming a hollow lure body of a flexible, substantially water insoluble material so that the lure body physically resembles natural fish food, the lure body having an opening therein, and providing a pressurizable injection device of the type having a chamber, a small outlet tube extending out of the chamber and means for putting the contents of the chamber under pressure to force the chamber contents through and out of a distal end of the outlet tube.

In a preferred form of the invention, a plurality of live earthworms are inserted into the chamber and the distal end of the outlet tube is inserted into the opening in the flexible lure body. Pressure is then applied to the chamber to force the earthworms out of the chamber, through the outlet tube and into the lure body while the earthworms are still alive, thereby forming a lure which has scent and motion characteristics of a live worm.

BRIEF DESCRIPTION OF THE DRAWING

In order to impart full understanding of the manner in which these and other objects are attained in accordance with the invention, a particularly advantageous embodiment thereof will be described with reference to the accompanying FIGURE of the drawing, which forms a part of this specification, and wherein the FIGURE is a side elevation, in partial section, of an apparatus for injecting bait into a lure in accordance with the present invention.

DESCRIPTION OF THE PREFERRED EMBODIMENT

A particularly unique aspect of the present invention involves the discovery or recognition of the fact that earthworms can be forced through a relatively small tube, on the order of 3/32 of an inch, without destroying the worms. While this may seem surprising, it has been found to work reliably and well, thereby permitting the formation of a lure which contains the live worms.

The method will be described in the context of a particular apparatus, but it will be recognized that various forms of apparatus can be used to create lures of different types.

Referring now to the drawing, there is shown, in section, an artificial lure indicated generally at 10 which comprises an elongated body of a flexible material such as rubber or very flexible plastic, which has been formed into the shape of an earthworm or the like, being elongated and hollow. One can also begin with a conventional artificial lure in the shape of a worm or some other creature such as shown in the Auten et al, U.S. Pat. No. 3,802,115 although it may be necessary to create or enlarge a hollow space within the lure, using an awl or some other suitable tool.

Having formed the lure, an opening is formed in the side, preferably near one end, if such an opening does not already exist. The opening should be as small as practical, depending upon the size of the remainder of the apparatus. However, the existence of an opening in the completed lure is not a disadvantage, but, rather, has some advantages as will be discussed.

The remainder of the apparatus involved comprises, essentially, a large syringe. The apparatus shown in the drawing was produced using a caulking gun and a veterinary syringe, modifying the two articles so that they are usable together.

The syringe itself includes a cylindrical body 12 and a piston 14 which is slidable within the body. Normally, the piston is connected to a hand-operated rod or the like which is used to force the piston toward the outlet end of the syringe. At the outlet end is provided a conical or tubular outlet tube 16 which, in the article which has been made and tested, has an inner diameter of about 3/32 inches although slightly larger or smaller sizes could be used. As will be recognized the drawing depicts the outlet tube disproportionately large for clarity.

The syringe is mounted in the shell of a caulking gun in the same manner that a tube of caulking compound would normally be installed, with the nozzle 16 in place of the nozzle of the caulking compound cartridge. As is conventional, the caulking gun has a generally semi-cylindrical tray 18 and a push rod 20 which terminates in a pushing plate 22 which can be used to push against the syringe piston 14. Rod 20 is provided with a plurality of notches 24. At the rear end of tray 18 is a trigger mechanism including a fixed handle 26 and a movable handle 28, the movable handle having an upwardly extending pawl schematically indicated at 30 which engages notches 24 as the movable handle 28 is pivoted in the direction of arrow 31, thereby pushing rod 20 in the direction of arrow 32.

To perform the method of the present invention, the chamber 15 between the piston and the nozzle end of the syringe is filled with a plurality of earthworms or other live bait. The syringe is then installed in the manner shown in the caulking gun and the distal end of nozzle 16 is inserted into the opening in the side of lure 10. The caulking gun mechanism is then operated to move piston 14 toward the nozzle, applying pressure to the contents of chamber 15.

It is not necessary to be concerned about aligning the worms is any particular way. Their alignment appears to be automatic as pressure is applied. The worms pass through the interior of outlet tube 16 and enter the interior of the lure. The worms remain alive during this process and for a considerable period of time, i.e., ½ hour or more, within the lure.

The lure can then be placed on a conventional hook 34, if it is not already provided with a hook, connected to a line and placed in the water to attract fish in the normal fashion.

As most anglers are aware, when one puts live bait on a hook into water, it is quite often the case that small or undesirable fish eat the bait without taking the hook. It is therefore possible to feed a considerable quantity of bait to these fish without getting a bite.

An artificial lure such as lure 10, however, cannot be consumed or destroyed by such fish. The lure is therefore considerably more durable than live bait alone and remains on the hook for an extended period of time until it is taken into the mouth of a fish, allowing the hook to engage.

While it is on the hook, however, the lure moves with considerable natural action because of the movement of the worms within the body of the lure. Additionally, liquid seeps from within the lure through the opening used to inject the bait, forming an attractive scent in the water which brings fish to the vicinity of the lure.

While other substances can be injected in this fashion, such as oysters and other forms of seafood, the injection of live worms is particularly desirable because no other bait provides the lure with the kind of natural "action" as worms. It is particularly important to recognize that the worms are not "prepared" in any way and are not combined with any foods or other substances.

While one advantageous embodiment has been chosen to illustrate the invention, it will be understood by those skilled in the art that various changes and modifications can be made therein without departing from the scope of the invention as defined in the appended claims.

What I claim is:

1. A method of making a lure which is attractive to fish comprising the steps of forming a hollow lure body of a flexible, substantially water-insoluble material so that the lure body generally resembles natural living fish food in size and shape, the lure body having an opening therein;

providing a pressurizable injection device of the type having a chamber, a small outlet tube extending out of the chamber and means for putting the chamber contents under pressure to force the chamber contents through and out of a distal end of the outlet tube;

inserting a plurality of live earthworms into the chamber;

inserting the distal end of the outlet tube into the opening in the flexible lure body;

applying pressure to the chamber to force the earthworms out of the chamber, through the outlet tube and into the lure body while the earthworms are still alive, thereby forming a lure which has scent and motion characteristics of a live worm.

* * * * *